United States Patent
Zheng et al.

(10) Patent No.: US 6,736,234 B2
(45) Date of Patent: May 18, 2004

(54) SYSTEM FOR CONTROLLING A STEERING WHEEL FEEL OF A VEHICLE STEERING WHEEL ASSEMBLY

(75) Inventors: Bing Zheng, Dublin, OH (US); M. Yi-Yang Huang, Troy, MI (US); Yixin Yao, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/448,783

(22) Filed: May 30, 2003

(65) Prior Publication Data

US 2003/0196847 A1 Oct. 23, 2003

Related U.S. Application Data

(62) Division of application No. 10/112,435, filed on Mar. 29, 2002.

(51) Int. Cl.[7] ................................................. B62D 5/04
(52) U.S. Cl. ..................................... 180/402; 180/446
(58) Field of Search ............................... 180/402, 443, 180/446; 71/41, 42

(56) References Cited

U.S. PATENT DOCUMENTS

| | | | |
|---|---|---|---|
| 4,688,655 A | | 8/1987 | Shimizu |
| 4,800,975 A | * | 1/1989 | Oshita et al. ............... 180/446 |
| 5,668,722 A | | 9/1997 | Kaufmann et al. |
| 5,704,446 A | | 1/1998 | Chandy et al. |
| 5,845,222 A | | 12/1998 | Yamamoto et al. |
| 5,996,724 A | | 12/1999 | Shimizu et al. |
| 6,041,882 A | * | 3/2000 | Bohner et al. ............... 180/402 |
| 6,082,482 A | * | 7/2000 | Kato et al. ................... 180/402 |
| 2001/0027364 A1 | * | 10/2001 | Matsuoka ...................... 701/41 |
| 2001/0047233 A1 | * | 11/2001 | Kleinau et al. ................ 701/41 |
| 2002/0108805 A1 | * | 8/2002 | Card ............................ 180/446 |

FOREIGN PATENT DOCUMENTS

| EP | 1 125 825 A2 | 8/2001 |
|---|---|---|
| EP | 1 211 159 A1 | 6/2002 |

* cited by examiner

Primary Examiner—Kevin Hurley
(74) Attorney, Agent, or Firm—Brinks Hofer Gilson & Lione

(57) ABSTRACT

The present invention involves a system and method of controlling a steering wheel for simulated steering feel on a steering wheel of a vehicle with front road wheels in a steer-by-wire system. The method includes sensing actual torsion on the steering wheel, comparing the actual torsion to a threshold torque value, sensing actual angular velocity of the steering wheel, and comparing the actual angular velocity to a threshold angular velocity. The method further includes generating a simulated steering feel torque on the steering wheel, if the actual torsion is greater than the threshold torque value and the actual angular velocity is less than the threshold angular velocity. The method further comprises returning the steering wheel to the center position at a specified angular velocity, if the actual torsion is less than the threshold torque value and the actual angular velocity is greater than the threshold angular velocity.

10 Claims, 3 Drawing Sheets

210

| STEERING WHEEL ANGULAR VELOCITY | TORQUE | MODE |
| --- | --- | --- |
| < $SWAV_{thred}$ | < $T_{thred}$ | STAY IN PREVIOUS MODE |
| < $SWAV_{thred}$ | > $T_{thred}$ | TORQUE CONTROL MODE |
| > $SWAV_{thred}$ | < $T_{thred}$ | RETURN CENTER CONTROL MODE |
| > $SWAV_{thred}$ | > $T_{thred}$ | STAY IN PREVIOUS MODE |

Fig. 4

SYSTEM FOR CONTROLLING A STEERING WHEEL FEEL OF A VEHICLE STEERING WHEEL ASSEMBLY

CROSS-REFERENCE TO RELATED APPLICATIONS

This patent application is a divisional application of pending non-provisional application having U.S. Ser. No. 10/112,435 filed on Mar. 29, 2002.

BACKGROUND

The present invention relates to a system and method of controlling a steering wheel of a vehicle steering wheel assembly for simulated steering feel in a steer-by-wire system.

Steer-by-wire systems are known and continue to be improved. Steer-by-wire systems replace some mechanical linkages between the steering wheel and the vehicle road wheels with electrical wires and electronic components which send electrical signals through the wires to link the steering wheel to the road wheels of the vehicle. In order to provide a realistic feel to a steer-by-wire system, mechanisms are placed along and adjacent a steering wheel and steering shaft of the vehicle to generate resistive torque on the steering wheel. This simulates for the driver a realistic feel to the vehicle steering wheel as though the driver was driving a vehicle having a conventional mechanical steering assembly.

Although current systems and methods of providing simulated steering feel are adequate, improvements can be made thereto. When a driver of a vehicle having conventional mechanical steering gears, e.g., rack-and-pinion or recirculating ball, rotates the steering wheel to turn the vehicle in a corresponding direction, the driver experiences resistive torque especially if the steering gear assembly is without power steering. Moreover, after the turn is made, the driver typically releases torque in the direction of the turn and allows the steering gear to rotate the steering wheel back toward a center position of the vehicle. In this situation, the driver typically maintains hand position over the steering wheel, but allows the steering wheel to freely turn back toward the center position.

Manufacturers and designers of steer-by-wire systems have been challenged in producing a steer-by-wire system which adequately and efficiently simulates a torque resistance to the driver during rotation of the steering wheel and a return to center action of the steering wheel after a vehicle turn is made. Manufacturers and designers of steer-by-wire systems have also been challenged in adequately and efficiently designing a system which maintains resistance torque or return to center actions based on steering wheel inputs by the driver and external disturbances.

SUMMARY OF THE INVENTION

Thus, one aspect of the present invention is to provide a system and method of controlling a steering wheel of a vehicle steering wheel assembly for simulated steering feel in a steer-by-wire system having torque control and return to center control modes.

Another aspect of the present invention is to provide the steer-by-wire system with a control logic which switches between torque control and return to center control modes, and determines whether to maintain operating in a current control mode.

In another aspect, the present invention generally provides a system and method for simulating a feel in the steering wheel typically produced by a conventional vehicle steering assembly such as a steering wheel column and rack-and-pinion assembly. The present invention allows a vehicle operator to experience a "realistic" feel as the steering wheel is rotated from a center position. Further, the steering wheel driver experiences a torque resistance when the steering wheel is rotated to turn the vehicle during normal operation. As typically experienced when steering a vehicle having mechanical steering gears, e.g., rack-and-pinion and recirculating ball. The present invention further provides a realistic or simulated steering feel by returning the steering wheel back to the center position after a vehicle turn is sensed, as typically experienced when operating a vehicle with mechanical steering gears.

Further aspects, features and advantages of the invention will become apparent from consideration of the following erudite description and the appended claims when taken in connection with the accompanying drawings.

BRIEF DESCRIPTION OF THE DRAWINGS

FIG. 4 is a table depicting a mode in which the steer-by-wire system operates based on actual angular velocity and actual torque of a steering wheel determined by the control logic.

DETAILED DESCRIPTION

Figure 1:
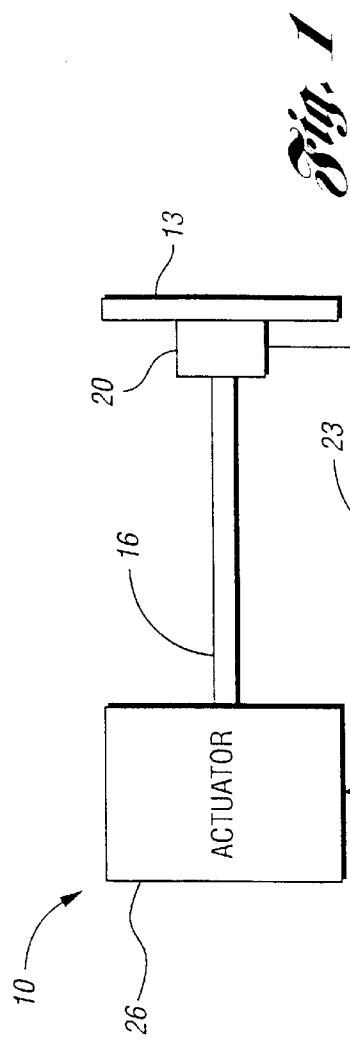
FIG. 1 is a schematic diagram of a steering wheel control assembly having a steer-by-wire system with a torque control mode and a return center control mode in accordance with the present invention.

FIG. 1 illustrates a steering wheel feel control assembly 10 of a vehicle having a steer-by-wire control system for simulating a steering feel on a steering wheel 13. As shown, steering wheel 13 is attached to a steering shaft 16. A sensor 20 is mounted to steering wheel 13 for sensing actual torsion and actual angular velocity of the steering wheel during normal operation of the vehicle. A controller 23 is in electrical communication with sensor 20 for receiving torque signals and velocity signals from sensor 20. An actual or input torque and actual angular velocity is applied to the steering wheel 13 by a driver during normal operation of the vehicle. As controller 23 receives angular velocity signals and torque signals from the sensor 20, controller 23 determines velocity error and torque error. Controller 23 also compares each of the errors to threshold values (as will be described in greater detail below). Controller 23 is further configured to switch between a torque control and a return to center control modes based on the actual angular velocity and the actual torsion on the steering wheel.

In the torque control mode, the system generates a simulated steering feel torque on the steering wheel to simulate hydraulic friction as the driver inputs torque on the steering wheel or rotates the steering wheel. In the return center control mode, the system returns the steering wheel to a center position at a specified angular velocity as the driver releases the steering wheel after a vehicle turn.

As shown in FIG. 1, an actuator 26 is in electrical communication with controller 23. Actuator 26 receives control signals indicative of velocity and torque errors from the controller 23 and applies a torque to the shaft to simulate a "traditional steering feel" based on the actual angular velocity and the actual torsion on the steering wheel.

The steering wheel sensor is configured to measure rotational displacement of the steering wheel assembly. Any type of suitable sensor may be used to sense rotational displacement of the steering wheel assembly. This may include potentiometers, optical sensors, encoder sensors, resolver sensors, and any other suitable sensor.

The motor may be any suitable motor capable of receiving signals ranging between 0–10 amps and capable of producing torque ranging between 0.0–5.0 Newton-meters.

In this embodiment, a motor amplifier (not shown) may be used. The motor amplifier is an electronic circuit which receives a torque signal from the controller and produces as output an electric signal whose voltage and current power the motor to produce the desired level of torque. The motor amplifier used may be any type of motor amplifier capable of receiving the signals ranging between about 0–10 amps and outputs torque ranging between 0.0–5.0 Newton-meters.

Figure 2:
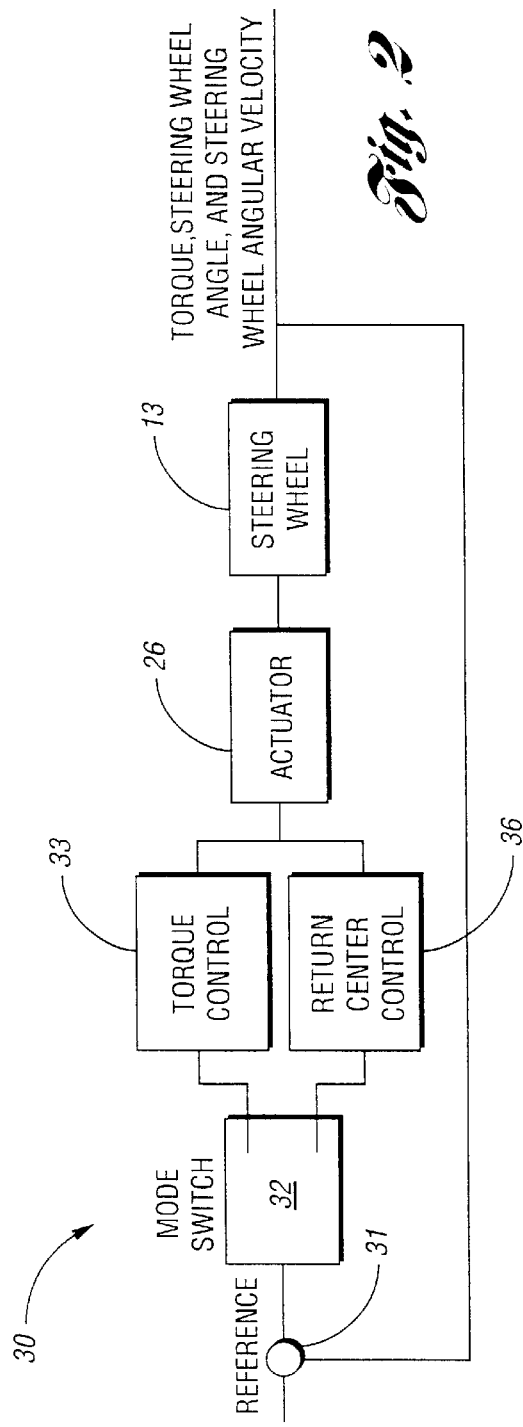
FIG. 2 is a control logic diagram of the steer-by-wire system for the steering wheel control assembly of FIG. 1.

FIG. 2 illustrates a control logic 30 implemented by steering wheel feel control assembly 10. As shown, a feed back control signal is received in summer 31. A feed back control signal is compared to a reference signal which is indicative of a predetermined reference value to determine a control mode in which to operate. Based on this determination, either torque control mode 33 or return center control mode 36 is selected or maintained by mode switch 32. The corresponding control signals are then transmitted to actuator 26 which applies torque indicative of the control signals sent. Based on the control mode determined, torque is applied by the actuator 26 through shaft 16 to the steering wheel 13.

Figure 3:
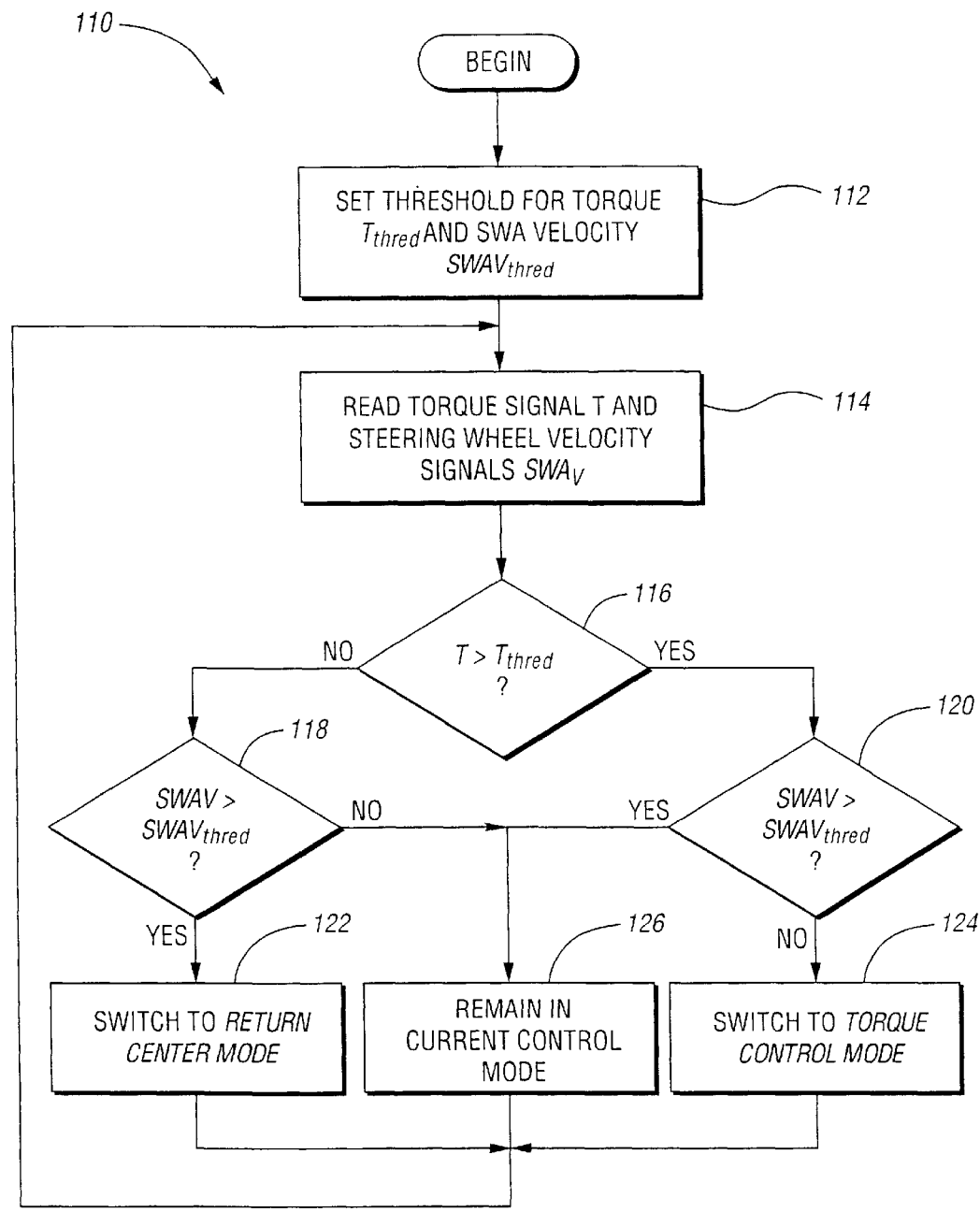
FIG. 3 is a flow chart illustrating one method of the steer-by-wire system in accordance with one method of the present invention.

FIG. 3 is a flow chart depicting one method of the control system implemented in steering wheel control assembly for simulated steering feel on the steering wheel. Variables, such as but not limited to, an angular velocity reference of the steering wheel, a threshold torque, and a threshold angular velocity may be set in the control system. The control system is configured to store set variables, such as the threshold angular velocity, the angular velocity reference, and the angular velocity reference, based on parameters used.

In box 114, the method includes sensing actual torsion and actual angular velocity of the steering wheel inputted by a driver during normal operation of the vehicle. Then, the method includes sending actual torsion and actual angular velocity signals, for example, to the controller. The actual torque signal is indicative of the actual torsion on the steering wheel inputted by the driver. Moreover, the actual angular velocity signal is indicative of actual angular velocity of the steering wheel.

Then, the method comprises receiving the actual torque signal. Thus, in this embodiment, the actual torsion is determined based on the actual torque signal. This may be accomplished by proportionally configuring the relation between the actual torque signal with the actual torsion on the steering wheel. In this embodiment the signal is a unit of voltage (volts) which may proportionally represent a unit of torque (Newton-meters).

A torque error is determined based on the torque reference and the actual torsion on the steering wheel. The torque reference may be a reference value being a function of driver input, vehicle speed, angular velocity of the steering wheel, and steering wheel angle. To accomplish this, the system determines the difference between a reference torque signal indicative of the torque reference and the actual torque signal. This produces a torque error signal which is indicative of actual torsion on the steering wheel based on driver input, vehicle speed, angular velocity of the steering wheel, and steering wheel angle.

In box 116, the torque error signal is compared to a threshold torque signal indicative of the threshold torque value. In effect, the actual torsion on the steering wheel is compared to the threshold torque value.

The method 110 further includes receiving an actual angular velocity signal indicative of actual angular velocity of the steering wheel inputted by the driver during normal operation of the vehicle. Then, method 110 includes determining a velocity error signal based on an angular velocity reference signal indicative of the angular velocity reference and the actual angular velocity signal. The angular velocity reference may be a reference value being a function of steering wheel angle and vehicle speed. To accomplish this, the system determines the difference between the angular velocity reference signal and the actual angular velocity signal to produce the velocity error signal. Depending on the torque error signal comparison, the velocity error signal is then compared in box 118 or 120 to a threshold angular velocity signal indicative of the threshold angular velocity. In effect, the system compares the actual angular velocity to the threshold angular velocity.

The system is configured to switch between a torque control mode and a return center control mode based on a comparison of the actual torsion to the threshold torque value and a comparison of the actual angular velocity of the steering wheel to the threshold angular velocity.

FIG. 4 illustrates modes to which the control system is configured to switch based on the angular velocity and torsion on the steering wheel. If the actual torsion is determined to be greater than the threshold torque value and the actual angular velocity is less than the threshold angular velocity, then the system operates in the torque control mode in box 124. In the torque control mode, the system generates a simulated steering feel torque on the steering wheel to simulate hydraulic friction as the driver inputs torque on the steering wheel or rotates the steering wheel. This is accomplished by sending a torque mode signal to the actuator which then indicates to the actuator to produce power to apply torque on the steering wheel, providing a simulated steering feel. In this embodiment, the simulated steering feel is resistive torque on the steering wheel opposite the direction of the actual torsion by the driver on the steering wheel.

However, if the actual torsion is determined to be less than the threshold torque value and the actual angular velocity is determined to be greater than the threshold angular velocity, then the system operates in the return center control mode in box 122. In the return center control mode, the system returns the steering wheel to a center position at a specified angular velocity as the driver releases the steering wheel after a vehicle turn. This is accomplished by sending a return center control signal, for example, to the actuator which indicates whether to apply torque for returning the steering wheel back to the center position at the specified angular velocity as the driver releases torque on the steering wheel after a vehicle turn. In this embodiment, the specified angular velocity ranges between about 0–540° per second. Either the torque control signal or the return center control signal is received and the corresponding torque is applied on the steering wheel.

Thus, the system is configured to store a reference angular position indicative of a center position of the steering wheel. In this embodiment, the center position represents a 0° position of the steering wheel in alignment with front road wheels of the vehicle.

When the actual angular velocity is less than the threshold angular velocity and the actual torsion on the steering wheel is less than the threshold torque value, the system maintains control of the steering wheel in a current control mode in box 126. The current control mode is defined as the mode (torque control or return center control) in which the steering wheel is controlled prior to sensing actual torsion and actual angular velocity of the steering wheel (box 114). Thus, the current control mode may either be the torque control mode or the return control mode. Moreover, if the system determines that the steering wheel angular velocity is greater than the threshold angular velocity and it is determined that the actual torque on the steering wheel is greater than the threshold torque value, then the system maintains control of the steering wheel in the current control mode in box 126.

It is to be noted that the comparison of actual values may be compared as feedback control signals so long as the feedback control signals to be compared are proportional with respect to the actual values corresponding to the signals they represent. In this embodiment, the torque error signal includes a voltage of about −10 volts to +10 volts, and the threshold torque is about 0.5–1.0 Newton-meter. The angular velocity signal, which is indicative of the actual angular velocity, is between about 0–1350 pulses per second. The threshold angular velocity is about 10°–30° per second. The threshold torque value may be represented by a threshold torque signal having a voltage of about 0–1 volts. The threshold angular velocity may be represented by a threshold angular velocity signal being about 25–75 pulses per second.

As shown in FIG. 3, the system returns to sensing actual angular velocity and actual torsion of the steering wheel in box 114. This is to further provide a simulated steering feel after the actuator applies torque on the steering wheel in box 122, 124, or 126. As a result of the torque applied on the steering wheel, the actual torsion and angular velocity of the steering wheel may typically change. The sensor senses the actual torsion and angular velocity again as in box 114.

In use, when the driver rotates the steering wheel from the center position to turn the vehicle, the control logic of the steer-by-wire system provides the driver with resistive torque to simulate torsion felt by a driver of a vehicle having a conventional mechanical steering wheel assembly. In applying torque, the control logic accounts for vehicle speed, input torque by the driver, steering wheel angle, and angular velocity. After the turn, the driver releases input torsion on the steering wheel to allow the steering wheel to freely return back toward the center position as the vehicle travels in a straight direction.

While the present invention has been described in terms of preferred embodiments, it will be understood, of course, that the invention is not limited thereto since modifications may be made to those skilled in the art, particularly in light of the foregoing teachings.

What is claimed is:

1. A system for controlling a steering wheel in a steer-by-wire system for simulated steering feel of a vehicle, the system comprising:
   a steering wheel having a steering shaft;
   a sensor disposed to the shaft, the sensor capable of sensing actual torsion on the steering shaft and sensing actual angular velocity of the steering wheel;
   a controller in electrical communication with the sensor, wherein the controller is configured to compare the actual angular velocity of the steering wheel to a threshold angular velocity and to compare the actual torsion to a threshold torque value; and
   an actuator disposed on the steering shaft and configured to generate a simulated steering feel torque on the steering wheel and to return the steering wheel to a center position at a specified angular velocity based on the comparison of the actual torsion to the threshold torque value and the comparison of the actual angular velocity to the threshold angular velocity.

2. The system of claim 1 wherein the actuator is configured to generate the simulated steering feel torque on the steering wheel, if the actual torsion is greater than the threshold torque value and the actual angular velocity is less than the threshold angular velocity and wherein the actuator is configured to return the steering wheel to the center position at the specified angular velocity, if the actual torsion is less than the threshold torque value and the actual angular velocity is greater than the threshold angular velocity.

3. The system of claim 1 wherein a reference angular position indicative of the center position of the steering wheel represents a 0° position of the front road wheels of the vehicle.

4. The system of claim 2 wherein the threshold value is about 0.5–10 Newton-meter.

5. The system of claim 2 wherein the threshold angular velocity is 10°–30° per second.

6. The system of claim 2 wherein the threshold torque value is a threshold torque signal having a voltage of about 0–1 volts.

7. The system of claim 2 wherein the threshold angular velocity is a threshold angular velocity signal about 25–75 pulses per second.

8. The system of claim 1 wherein the simulated steering feel torque is resistive torque on the steering wheel opposite the direction of the actual torsion on the steering wheel.

9. The system of claim 1 wherein the specified angular velocity is 0–540° per second.

10. A system for controlling a steering wheel in a steer-by-wire system for simulated steering feel of a vehicle, the system comprising:
    a steering wheel having a steering shaft;
    a sensor disposed to the shaft, the sensor configured to sense actual torsion on the steering shaft and to sense actual angular velocity of the steering wheel;
    a controller in electrical communication with the sensor configured to compare the actual angular velocity of the steering wheel to a threshold angular velocity and to compare the actual torsion to a threshold torque value; and
    an actuator disposed on the steering shaft configured to generate a simulated steering feel torque on the steering wheel and to return the steering wheel to a center position at a specified angular velocity based on the comparison of the actual torsion to the threshold torque value and the comparison of the actual angular velocity to the threshold angular velocity,
    wherein the actuator is configured to generate the simulated steering feel torque on the steering wheel, if the actual torsion is greater than the threshold torque value and the actual angular velocity is less than the threshold angular velocity and wherein the actuator is configured to return the steering wheel to the center position at the specified angular velocity, if the actual torsion is less than the threshold torque value and the actual angular velocity is greater than the threshold angular velocity.

* * * * *